US010915294B2

(12) United States Patent
Wu et al.

(10) Patent No.: US 10,915,294 B2
(45) Date of Patent: Feb. 9, 2021

(54) SOUND ADJUSTMENT METHOD FOR HEARING PROTECTION AND SOUND ADJUSTMENT DEVICE PERFORMING THE SAME

(71) Applicant: Unlimiter MFA Co., Ltd., Eden Island (SC)

(72) Inventors: Po-Jui Wu, Taipei (TW); Kuo-Ping Yang, Taipei (TW); Kuan-Li Chao, Taipei (TW); Jian-Ying Li, Taipei (TW); Wei-Lin Chang, Taipei (TW); Kai-Yuan Hsiao, Taipei (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 16/697,252

(22) Filed: Nov. 27, 2019

(65) Prior Publication Data
US 2020/0371743 A1    Nov. 26, 2020

(30) Foreign Application Priority Data
May 23, 2019    (TW) .............................. 108117790 A

(51) Int. Cl.
*H03G 5/00* (2006.01)
*H03G 3/20* (2006.01)
*H03G 7/00* (2006.01)
*G06F 3/16* (2006.01)
*G10L 25/51* (2013.01)
*H04R 29/00* (2006.01)

(52) U.S. Cl.
CPC .............. *G06F 3/165* (2013.01); *G10L 25/51* (2013.01); *H04R 29/001* (2013.01); *H04R 2430/01* (2013.01)

(58) Field of Classification Search
CPC .............................. H04R 25/356; H03G 9/025
USPC .......................................... 381/104, 106–107
See application file for complete search history.

(56) References Cited

U.S. PATENT DOCUMENTS

| 9,391,575 B1 * | 7/2016 | Yang ..................... H03G 3/3089 |
| 2007/0223752 A1 * | 9/2007 | Boretzki ................ H04R 25/70 381/312 |
| 2011/0164855 A1 * | 7/2011 | Crockett .................. H04N 5/91 386/230 |

* cited by examiner

Primary Examiner — George C Monikang
(74) Attorney, Agent, or Firm — Bacon & Thomas, PLLC

(57) ABSTRACT

A sound adjustment method includes the following steps: obtaining a sound signal including frequency bands with a corresponding original sound pressure level value; converting the original sound pressure level value of each frequency band into a corresponding loudness level value; adjusting each loudness level value by a preset loudness level value to obtain an adjusted loudness level value of each frequency band; converting each adjusted loudness level value into a corresponding adjusted sound pressure level value; calculating a target sound pressure level value of each frequency band according to the original sound pressure level of each frequency band and each adjusted sound pressure level value; adjusting the original sound pressure level value of each frequency band by each target sound pressure level value to obtain an adjusted sound signal; outputting the adjusted sound signal.

6 Claims, 4 Drawing Sheets

| | frequency band | | |
|---|---|---|---|
| | 100 (Hz) | 1000 (Hz) | 10000(Hz) |
| original sound pressure level value (Unit) | 100(dB) | 90(dB) | 80(dB) |
| loudness level value (Unit) | 91(phon) | 90(phon) | 67(phon) |
| adjusted loudness level value (Unit) | 76(phon) | 75(phon) | 52(phon) |
| adjusted sound pressure level value (Unit) | 90(dB) | 75(dB) | 66(dB) |
| target sound pressure level value (Unit) | -10(dB) | -15(dB) | -14(dB) |

FIG.4

SOUND ADJUSTMENT METHOD FOR HEARING PROTECTION AND SOUND ADJUSTMENT DEVICE PERFORMING THE SAME

BACKGROUND OF THE INVENTION

1. Field of the Invention

The present invention relates to a sound adjustment method and a sound adjustment device for performing the same, and more particularly, to a sound adjustment method capable of automatically adjusting a sound pressure level value according to a loudness level value and a sound adjustment device for performing the same.

2. Description of the Related Art

Nowadays people often use headphones to listen to music to pursue a better listening experience. However, headphone use can damage the user's hearing, and longer exposure to loud sounds will cause a greater impact on the user's hearing; therefore, a way of automatically controlling the volume has been developed. However, at present, the automatic volume control of the headphones is done by directly performing the same adjustment in sound pressure level values of the sound at different frequency bands, but the magnitude of the sound pressure level values does not represent the actual hearing experience of users, and thus the automatic volume control method based on the sound pressure level values does not meet the actual hearing situation of the users.

Therefore, it is necessary to provide a new sound adjustment device with a hearing protection function and a sound adjustment method thereof to overcome the deficiencies of the prior art.

SUMMARY OF THE INVENTION

It is an object of the present invention is to provide a sound adjustment method for automatically adjusting the sound pressure level value of sound according to adjustment in the loudness level value of the sound.

It is another object of the presentation to provide a sound adjustment device for performing the above method.

In order to achieve the above objects, the present invention provides a sound adjustment method applied to a sound adjustment device. The sound adjustment method is used for adjusting a sound signal, and the method comprises the following steps: obtaining a sound signal, wherein the sound signal comprises a plurality of frequency bands, and each frequency band has a corresponding original sound pressure level value; converting the original sound pressure level value of each frequency band into a corresponding loudness level value respectively; adjusting each loudness level value by a preset loudness level value to obtain an adjusted loudness level value of each frequency band; converting each adjusted loudness level value into a corresponding adjusted sound pressure level value respectively; calculating a target sound pressure level value of each frequency band according to the original sound pressure level value of each frequency band and each adjusted sound pressure level value; adjusting the original sound pressure level value of each frequency band by each target sound pressure level value to obtain an adjusted sound signal; and outputting the adjusted sound signal.

The present invention provides a sound adjustment device for adjusting a sound signal. The sound adjustment device comprises an input end, a processing unit and an output end. The input end is used for obtaining the sound signal, wherein the sound signal comprises a plurality of frequency bands, and each frequency band has a corresponding original sound pressure level value. The processing unit is electrically connected to the input end, and the processing unit comprises a first conversion module, a loudness adjustment module, a second conversion module, a computing module, and a sound intensity adjustment module. The first conversion module is used for converting the original sound pressure level value of each frequency band into a corresponding loudness level value respectively. The loudness adjustment module is used for adjusting each loudness level value by a preset loudness level value to obtain an adjusted loudness level value of each frequency band. The second conversion module is used for converting each adjusted loudness level value into a corresponding adjusted sound pressure level value respectively. The computing module is used for calculating a target sound pressure level value of each frequency band according to the original sound pressure level value of each frequency band and each adjusted sound pressure level value. The sound intensity adjustment module is used for adjusting the original sound pressure level value of each frequency band by each target sound pressure level value to obtain an adjusted sound signal. The output end is electrically connected to the processing unit for outputting the adjusted sound signal.

BRIEF DESCRIPTION OF THE DRAWINGS

FIG. 4 illustrates a schematic diagram showing the transition between the sound pressure level value and the loudness level value.

DETAILED DESCRIPTION OF THE PREFERRED EMBODIMENT

In or de r to make the structure and characteristics as well as the effectiveness of the present invention to be further understood and recognized, a detailed description of the present invention is provided as follows, along with embodiments and accompanying figures.

Figure 1:
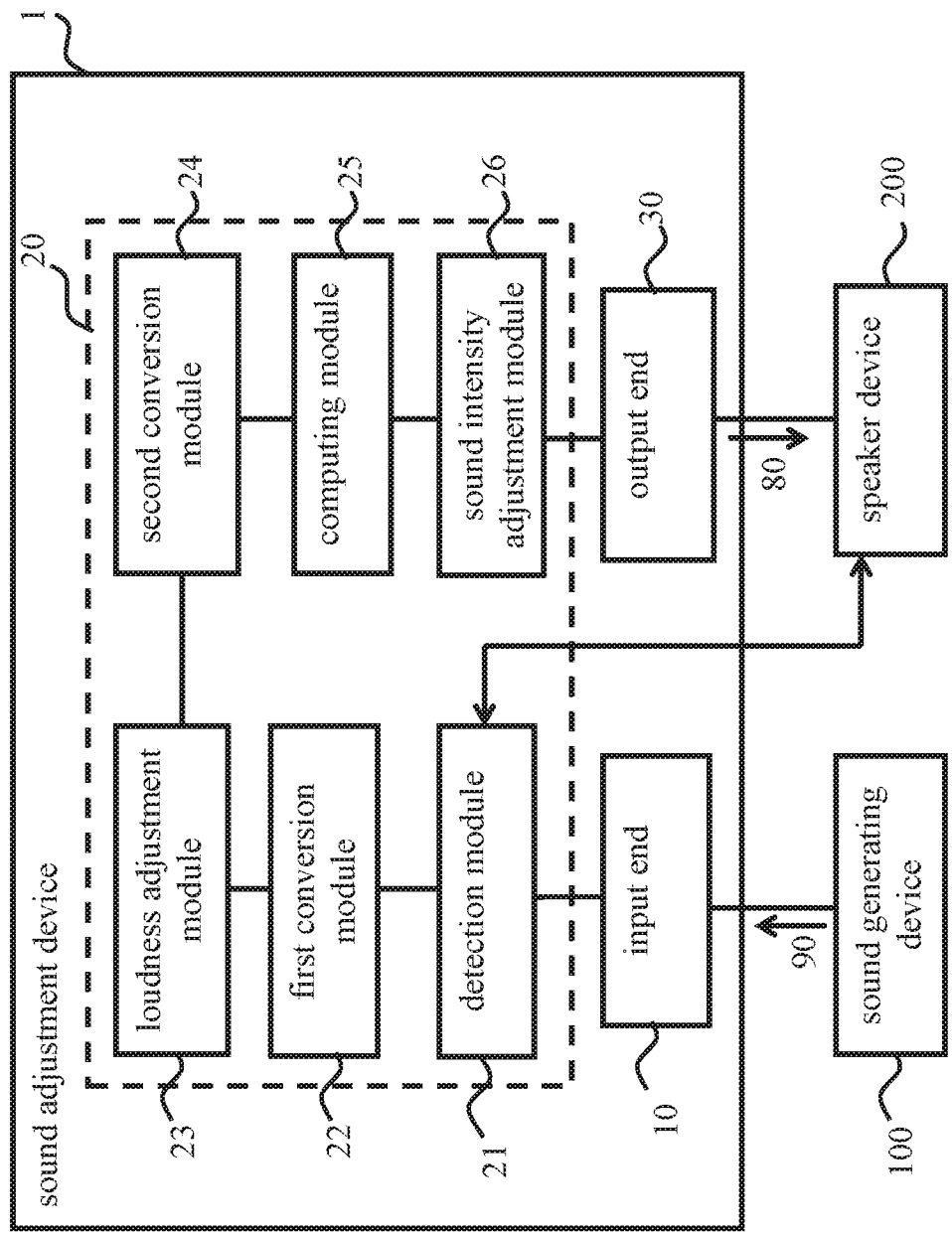
FIG. 1 illustrates a structural diagram of an embodiment of a sound adjusting device of the present invention.

Please refer to FIG. 1 for a structural diagram of an embodiment of a sound adjusting device of the present invention.

As s how n in FIG. 1, the sound adjustment device 1 of the present invention has a hearing protection function and is used for adjusting sound pressure level values of different frequency bands of a sound signal generated by a sound generating device 100 when the volume and the accumulated playback time of the sound played by a speaker device 200 exceed a set condition, and the speaker device 200 will play sound according to the sound signal, the sound pressure level values of which are adjusted to avoid damaging the user's hearing. In addition, the sound adjustment device 1 of the present invention can also adjust the sound pressure level values of the sound signal according to a sound adjustment command inputted by a user. In a specific embodiment of the present invention, the sound generating device 100 may be a device that generates a sound signal, such as an audio device, a television, or a mobile phone, and the speaker device 200 may be a headphone or a speaker, but the present invention is not limited to the devices listed above. In addition, in a preferred embodiment, the sound adjustment device 1 may be a microprocessor chip disposed in the sound generating device 100 and may communicate with the speaker device 200 in a wired or wireless manner. However, the invention is not limited thereto. In other embodiments, the sound adjustment device 1 may also be disposed in the speaker device 200 to communicate with the sound generating device 100 in a wired or wireless manner.

As shown in FIG. 1, in an embodiment of the present invention, the sound adjustment device 1 includes an input end 10, a processing unit 20, and an output end 30.

In an embodiment of the present invention, the input end 10 is in communication with the sound generating device 100 to obtain a sound signal 90 generated by the sound generating device 100. The sound signal 90 includes a plurality of frequency bands, and each frequency band has its own original sound pressure level value.

In an embodiment of the present invention, the processing unit 20 is electrically connected to the input end 10. The processing unit 20 includes a detection module 21, a first conversion module 22, a loudness adjustment module 23, a second conversion module 24, a computing module 25, and a sound intensity adjustment module 26. Please note that the above modules can be accomplished by hardware devices, software programs, firmware or combinations thereof, and that they can also be configured in the form of circuit loops or other suitable formats; further, each of the modules can be configured either in an independent form or in a combined form. In one preferred embodiment, each of the modules is a software program stored in a storage unit (not shown in figures) of the controller 20, and a processing unit (not shown in figures) of the controller 20 will execute each module to achieve the purpose of the present invention. Moreover, the embodiment disclosed herein only describes a preferred embodiment of the present invention. To avoid redundant description, not all possible variations and combinations are described in detail in this specification. However, those skilled in the art will understand that the above modules or components are not all necessary parts, and that in order to implement the present invention, other more detailed known modules or components might also be included. It is possible that each module or component can be omitted or modified depending on different requirements, and it is also possible that other modules or components might be disposed between any two modules.

In an embodiment of the invention, the detection module 21 is used for detecting whether the volume and the accumulated time of the sound previously played by the speaker device 200 exceed a set condition, or whether a sound adjustment command is received. If the detection module 21 detects that the volume and the accumulated playback time of the sound played by the speaker device 200 has exceeded the set condition, for example, the speaker device 200 has previously played a sound of which the volume is 85 to 87 dB for 288 seconds or the detection module 21 has received a sound adjustment command inputted by a user through an input interface, the processing unit 20 will start to adjust sound pressure level values of the received sound signal 90 in the following manner.

In an embodiment of the present invention, the first conversion module 22 converts the original sound pressure level value of each frequency band of the sound signal 90 to a corresponding loudness level value respectively according to an equal-loudness contour. The so-called "Sound Pressure Level (SPL)" is an objective physical quantity of sound intensity and is expressed in units of decibels (dB). "Loudness level" is the subjective psychological quantity that represents the sound intensity and is expressed in units of phons. In a specific embodiment, the sound adjustment device 1 can store a standard equal-loudness contour, such as a Fletcher-Munson curve, or any other suitable equal-loudness contours.

In an embodiment of the present invention, the loudness adjustment module 23 is used for adjusting each loudness level value by a preset loudness level value to obtain an adjusted loudness value of each frequency band of the sound signal 90. In a specific embodiment, if the adjustment is performed by determining whether the volume and the accumulated playback time of the sound previously played by the speaker device 200 exceed the set condition, the preset loudness level value will be determined based on the volume and the accumulated playback time of the sound previously played by the speaker device 200. The relationship between the preset loudness level value and the volume and accumulated playback time of the sound previously played by the speaker device 200 will be described in more detail below and will not be further described herein. In addition, if the adjustment is performed according to the received sound adjustment command, the preset loudness level value may be a constant value set in advance, such as 15 phons.

In an embodiment of the present invention, the second conversion module 24 is used for converting each adjusted loudness level value into a corresponding adjusted sound pressure level value respectively. Similarly, the conversion between each adjusted loudness level value and each adjusted sound pressure level value is also based on the aforementioned equal-loudness contour, but is not limited thereto.

In an embodiment of the present invention, the computing module 25 is used for calculating a target sound pressure level value for each frequency band of the sound signal 90 according to the original sound pressure level values and the adjusted sound pressure level values of each of the frequency bands of the sound signal 90. For example, suppose that the sound signal 90 has an original sound pressure level value of 90 decibels at the 1,000 Hz band and that the sound signal 90 has an adjusted sound pressure level value of 75 dB at the 1,000 Hz band; then the computing module 25 will subtract the original sound pressure level value of 90 decibels from the adjusted sound pressure level value of 75 dB to Obtain a target sound pressure level value of −15 dB.

In an embodiment of the present invention, the sound intensity, adjustment module 26 is used for adjusting the original sound pressure level value of each frequency band of the sound signal 90 by each target sound pressure level value to obtain an adjusted sound signal 80. For example, suppose that the original sound pressure level value of the sound signal 90 at the 1,000 Hz band is 90 dB and that the calculated target sound pressure level value is −15 dB; then the sound pressure level value of the adjusted sound signal 80 at the 1,000 Hz band is 75 dB, which is equal to the original sound pressure level value of 90 dB plus the target sound pressure level value of −15 dB.

In an embodiment of the present invention, the output end 30 is electrically connected to the processing unit 20 and is in communication with the speaker device 200 in a wired or wireless manner. The output end 30 is used for outputting the adjusted sound signal 80.

Figure 2:
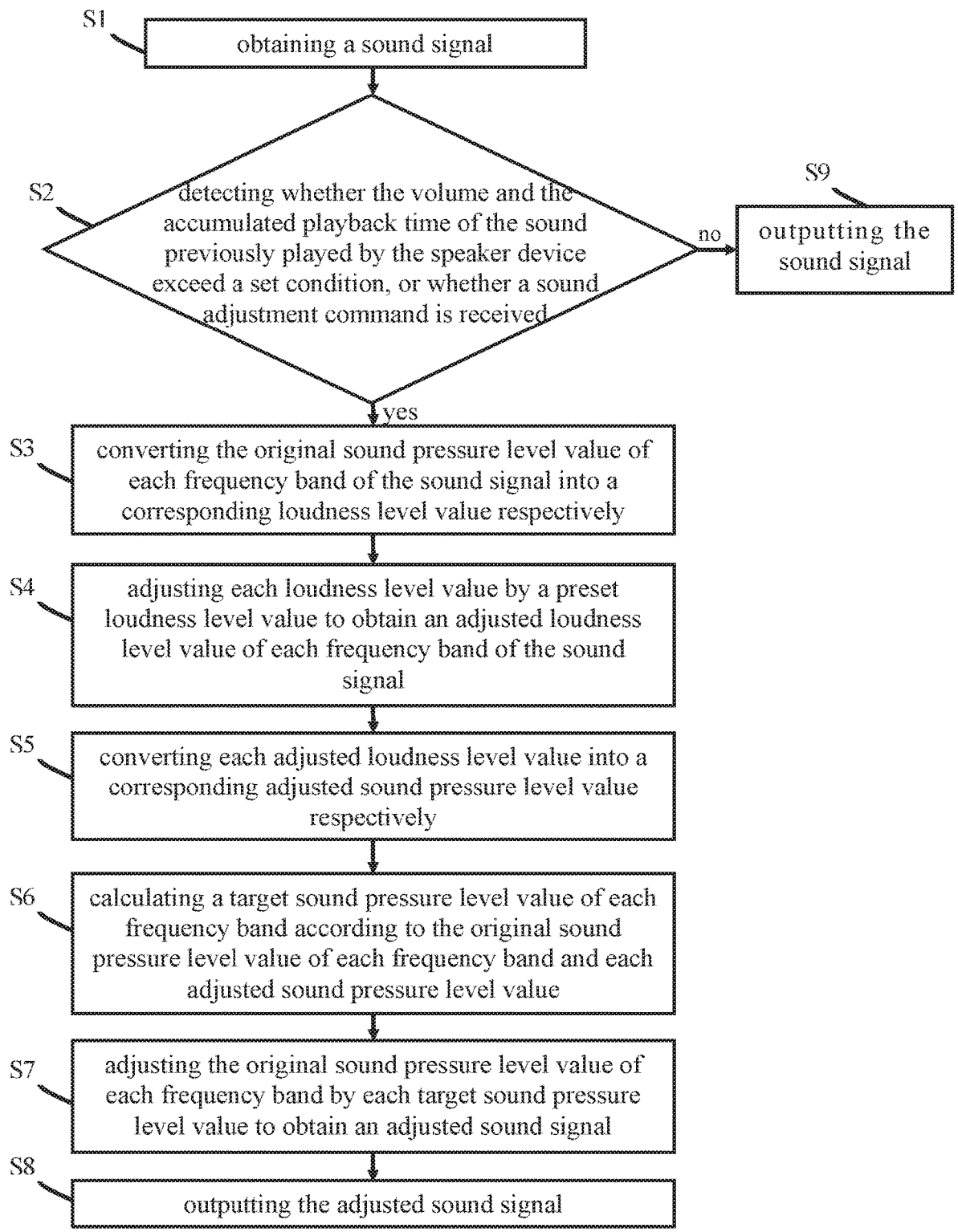
FIG. 2 illustrates a flow chart of the steps of an embodiment of the sound adjustment method of the present invention.
Figure 3:
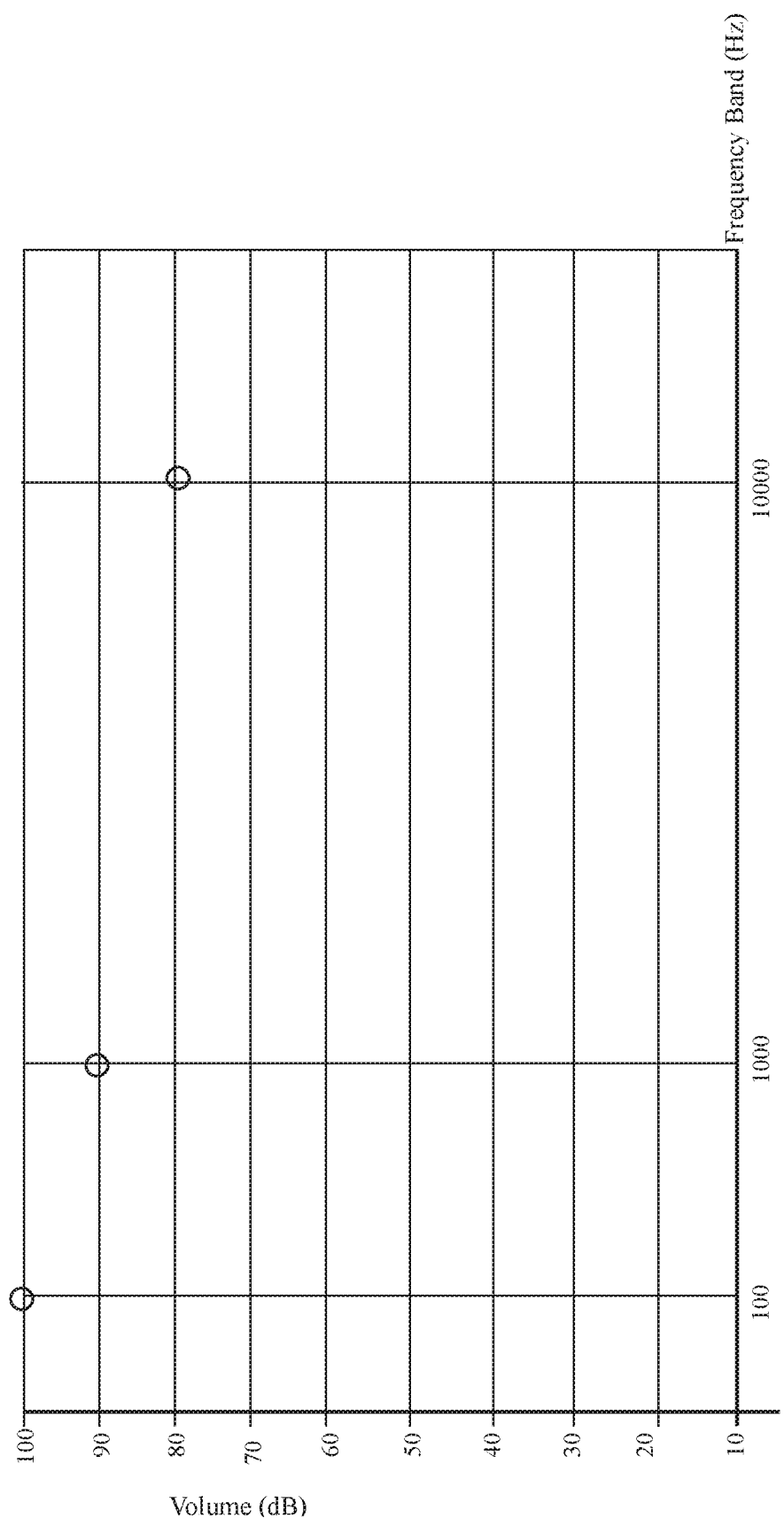
FIG. 3 illustrates a diagram showing the volumes of different frequency bands of the sound signal.

Next, please refer to FIG. 1 to FIG. 4, wherein FIG. 2 is a flow chart of steps of an embodiment of the sound adjustment method of the present invention, which will be described below with reference to FIG. 1, FIG. 3, and FIG. 4. It is noted that the sound adjustment method of the present invention is described below by taking the sound adjustment device 1 as an example. However, the sound adjustment method of the present invention does not necessarily use the same structure of the sound adjustment device 1 as described above.

First, step S1 is performed: obtaining a sound signal.

The input end 10 is signally connected to the sound generating device 100 in a wired or wireless manner to obtain the sound signal 90 generated by the sound generating device 100. The sound signal 90 includes a plurality of frequency bands, and each frequency band has a corresponding original sound pressure level value. As shown in FIG. 3 as an example, the plurality of frequency bands can include three frequency bands, including 100 Hz, 1,000 Hz, and 10,000 Hz. The original sound pressure level value of the 100 Hz band is 100 dB, the original sound pressure level value of the 1,000 Hz band is 90 dB, and the original sound pressure level value of the 10,000 Hz band is 80 dB, but the invention s not limited thereto.

Then step S2 is performed: detecting whether the volume and the accumulated playback time of the sound previously played by the speaker device exceed a set condition, or whether a sound adjustment command is received.

The detection module 21 of the processing unit 20 can detect whether the volume and the accumulated playback time of the sound previously played by the speaker device 200 exceed a set condition, or detect whether a sound adjustment command input by a user is received. If the volume and the accumulated playback time of the sound played by the speaker device 200 do not exceed the set condition and the processing unit 20 does not receive the sound adjustment command, the sound signal will be not adjusted, and the sound signal 90 will be directly outputted (i.e., step S9 is performed). If the detection module 21 detects that the volume and the accumulated playback time of the sound played by the speaker device 200 have exceeded the set condition, for example, the speaker device 200 has previously played sound of 85 to 87 dB for 288 seconds or a sound adjustment command inputted by a user through an input interface is received, the processing unit 20 will start to adjust the sound pressure level values of the sound signal 90 by the following steps S3 to S7. That is, the sound adjustment method of the present invention can be applied to two situations, including decreasing automatically the playback volume to protect users' hearing, or increasing or decreasing the playback volume according to the users' own control.

The step S3 is performed: converting the original sound pressure level value of each frequency band of the sound signal into a corresponding loudness level value respectively.

When it is detected that the volume and the accumulated time of the sound previously played by the speaker device 200 exceed the set condition or that a sound adjustment command is inputted, the first conversion module 22 converts the original sound pressure level value of each frequency band of the sound signal 90 into a corresponding loudness level value based on an equal-loudness contour, such as a Fletcher-Munson curve, previously stored in the sound adjustment device 1. Take the above example as an example; as shown in FIG. 4, the original sound pressure level value of the 100 Hz band is 100 dB, which is converted to a corresponding loudness level value of 91 (phons), and the original sound pressure level value of the 1,000 Hz band is 90 dB, which is converted to a corresponding loudness level value of 90 (phons), and the original sound pressure level value of the 10,000 Hz band is 80 dB, which is converted to a corresponding loudness level value of 67 (phons).

Then step S4 is performed: adjusting each loudness level value by a preset loudness level value to obtain an adjusted loudness level value of each frequency band of the sound signal.

After step S3 is completed, the loudness adjustment module 23 adjusts each loudness level value obtained in step S3 by a preset loudness level value to obtain an adjusted loudness level value of each frequency band of the sound signal 90. For example, as shown in FIG. 4, the preset loudness level value is −15 (phons); therefore, the adjusted loudness level value of the 100 Hz band is 76 (phons), the adjusted loudness level value of the 1,000 Hz band is 75 (phons), and the adjusted loudness level value of the 10,000 Hz band is 52 (phons). It is noted that, in a preferred embodiment, if the adjustment is performed according to the condition that the volume and the accumulated playback time of the sound previously played by the speaker device 200 have exceeded the set condition, then the preset loudness level value of the present invention may be determined based on the volume and accumulated playback time of the sound previously played by the speaker device 200, which is not a unique value. The specific relationship between the preset loudness level value and the volume and accumulated playback time of the sound previously played by the speaker device 200 is shown in the following table, but the present invention is not limited thereto.

| Playback Volume (unit: dB) | Accumulated Playback Time (unit: s) | Preset Loudness Level Value (unit: phons) |
|---|---|---|
| 85-87 | 288 | −5 |
|  | 432 | −10 |
|  | 504 | −15 |
| 88-90 | 144 | −5 |
|  | 216 | −10 |
|  | 252 | −15 |
| 91-93 | 72 | −5 |
|  | 108 | −10 |
|  | 126 | −15 |
| 94-96 | 36 | −5 |
|  | 54 | −10 |
|  | 63 | −15 |
| 97-99 | 18 | −5 |
|  | 27 | −10 |
|  | 31.5 | −15 |
| 100-102 | 9 | −5 |
|  | 13.5 | −10 |

As can be seen from the above table, in the example, if the speaker device 200 has previously played a sound of 85 to 87 dB for 288 seconds, the loudness adjustment module 23 will lower the loudness level value by 5 (phons) (that is, the preset loudness level value is −5 (phons)). If the speaker device 200 has previously played a sound of 85 to 87 dB for 504 seconds, the loudness adjustment module 23 will lower the loudness level value by 15 (phons) (that is, the preset loudness level value is −15 (phons)). If the speaker device 200 has previously played a sound of 94 to 96 dB for 63 seconds, the loudness adjustment module 23 will also lower the loudness level value by 15 (phons) (that is, the preset loudness level value is −15 (phons)). In addition, if the adjustment is performed according to the received sound adjustment command, the preset loudness level is a constant value set in advance. For example, suppose that the loudness level value of the 100 Hz band is 91 (phons); if the processing unit 20 receives the sound adjustment command inputted by a user to turn up the volume, the loudness adjustment module 23 will increase the loudness level value by 15 (phons) (that is, the preset loudness level value is 15 (phons) to obtain an adjusted loudness level value of 1.06 (phons) for the frequency band.

Then step S5 is performed: converting each adjusted loudness level value into a corresponding adjusted sound pressure level value respectively.

After step S4 is completed, the second conversion module 24 converts each adjusted loudness level value into a corresponding adjusted sound pressure level value according to the equal-loudness contour. Please refer to FIG. 4 as an example: The adjusted loudness level value of the 100 Hz band is 76 (phons), which is converted to a corresponding adjusted sound pressure level value of 90 dB; the adjusted loudness level value of the 1,000 Hz band is 75 (phons), which is converted to a corresponding adjusted sound pressure level value of 75 dB; the adjusted loudness level value of the 10,000 Hz band is 52 (phons), which is converted to a corresponding adjusted sound pressure level value of 66 dB.

Then step S6 is performed: calculating a target sound pressure level value of each frequency band according to the original sound pressure level value of each frequency band and each adjusted sound pressure level value.

After obtaining each adjusted sound pressure level value, then the calculation module 25 calculates a target sound pressure level value of each of frequency bands according to the original sound pressure level values of each of the frequency bands and each adjusted sound pressure level value. For example, in the previous example, the original sound pressure level value of the 100 Hz band is 100 dB, and the adjusted sound pressure level value is 90 dB, so the calculation module 25 calculates the difference between 90 dB and 100 dB, which is −10 dB, as a target sound pressure level value; that is, the target sound pressure level value is equal to the adjusted sound pressure level value minus the original sound pressure level value. The original sound pressure level value in the 1,000 Hz band is 90 dB, and the adjusted sound pressure level is 75 dB, so a target sound pressure level value obtained is −15 dB, the original sound pressure level value in the 10,000 Hz band is 80 dB, and the adjusted sound pressure level value is 66 dB, so a target sound pressure level value is −14 dB.

Then step S7 is performed: adjusting the original sound pressure level value of each frequency band by each target sound pressure level value to obtain an adjusted sound signal.

After obtaining each target sound pressure level value, the sound intensity adjustment module 26 adds each target sound pressure level value to the original sound pressure level value of each frequency band to obtain an adjusted sound signal 80. Continuing to use the above example, the adjusted sound signal 80 includes a 100 Hz band, a 1,000 Hz band, and a 10,000 Hz band, and the sound pressure level values of each of the frequency bands are 90 dB, 75 dB, and 66 dB, respectively.

Finally, step S8 is performed: outputting the adjusted sound signal.

Finally, the output end 14 is used for outputting the adjusted sound signal 80 to the speaker device 200.

According to the abovementioned description, the sound adjustment device 1 of the present invention can adjust the sound pressure levels of different frequency bands of the sound respectively to achieve a better hearing protection effect, and since the adjustment is based on reduced loudness level values, the adjustment of the present invention can meet the actual hearing situation of the users.

Please note that the abovementioned embodiment only describes a preferred embodiment of the present invention. To avoid redundant description, not all possible variations and combinations are described in detail in this specification. However, those skilled in the art will understand that the above modules or components are not all necessary parts, and that in order to implement the present invention, other more detailed known modules or components might also be included. It is possible that each module or component can be omitted or modified depending on different requirements, and it is also possible that other modules or components might be disposed between any two modules.

What is claimed is:

1. A sound adjustment method, applied to a sound adjustment device and used for adjusting a sound signal, the sound adjustment method comprising the following steps of:
    obtaining the sound signal, wherein the sound signal comprises a plurality of frequency bands and each frequency band has a corresponding original sound pressure level value;
    converting the original sound pressure level value of each frequency band into a corresponding loudness level value respectively;
    adjusting each loudness level value by a preset loudness level value to obtain an adjusted loudness level value of each frequency band;
    converting each adjusted loudness level value into a corresponding adjusted sound pressure level value respectively;
    calculating a target sound pressure level value of each frequency band according to the original sound pressure level value of each frequency band and each adjusted sound pressure level value;
    adjusting the original sound pressure level value of each frequency band by each target sound pressure level value to obtain an adjusted sound signal;
    outputting the adjusted sound signal; and
    detecting whether a volume and an accumulated playback time of sound previously played by a speaker device exceed a set condition;
    wherein the preset loudness level value is determined according to the volume and the accumulated playback time of sound previously played by the speaker device.

2. The sound adjustment method as claimed in claim 1, wherein the steps of converting the original sound pressure level value of each frequency band into the corresponding loudness level value respectively and converting each adjusted loudness level value into the corresponding adjusted sound pressure level value respectively are performed according to an equal-loudness contour.

3. The sound adjustment method as claimed in claim 1, further comprising the following step of:
    detecting whether a sound adjustment command is received.

4. A sound adjustment device, used for adjusting a sound signal, the sound adjustment device comprising:
    an input end, used for obtaining the sound signal, wherein the sound signal comprises a plurality of frequency bands and each frequency band has a corresponding original sound pressure level value;

a processing unit, electrically connected to the input end, the processing unit comprising:
a first conversion module, used for converting the original sound pressure level value of each frequency band into a corresponding loudness level value respectively;
a loudness adjustment module, used for adjusting each loudness level value by a preset loudness level value to obtain an adjusted loudness level value of each frequency band;
a second conversion module, used for converting each adjusted loudness level value into a corresponding adjusted sound pressure level value respectively;
a computing module, used for calculating a target sound pressure level value of each frequency band according to the original sound pressure level value of each frequency band and each adjusted sound pressure level value; and
a sound intensity adjustment module, used for adjusting the original sound pressure level value of each frequency band by each target sound pressure level value to obtain an adjusted sound signal;
an output end, electrically connected to the processing unit, for outputting the adjusted sound signal; and
a detection module, used for detecting whether a volume and an accumulated playback time of sound previously played by a speaker device exceed a set condition;
wherein the preset loudness level is determined according to the volume and the accumulated playback time of the sound previously played by the speaker device.

5. The sound adjustment device as claimed in claim 4, wherein the first conversion module converts the original sound pressure level value of each frequency band into the corresponding loudness level value respectively according to an equal-loudness contour and the second conversion module converts each adjusted loudness level value into the corresponding adjusted sound pressure level value respectively according to the equal-loudness contour.

6. The sound adjustment device as claimed in claim 4, wherein said detection module is used for detecting whether a sound adjustment command is received.

\* \* \* \* \*